(12) United States Patent
Ishimaru et al.

(10) Patent No.: US 7,726,878 B2
(45) Date of Patent: Jun. 1, 2010

(54) CLINICAL THERMOMETER

(75) Inventors: Youji Ishimaru, Tokyo (JP); Masayuki Nakahara, Tokyo (JP); Hideki Iwayama, Tokyo (JP)

(73) Assignee: Pigeon Corporation, Tokyo (JP)

( * ) Notice: Subject to any disclaimer, the term of this patent is extended or adjusted under 35 U.S.C. 154(b) by 3 days.

(21) Appl. No.: 11/720,021

(22) PCT Filed: Nov. 15, 2005

(86) PCT No.: PCT/JP2005/020944

§ 371 (c)(1),
(2), (4) Date: Aug. 27, 2007

(87) PCT Pub. No.: WO2006/059479

PCT Pub. Date: Jun. 8, 2006

(65) Prior Publication Data

US 2010/0040110 A9   Feb. 18, 2010

(30) Foreign Application Priority Data

Nov. 30, 2004  (JP) .............................. 2004-346586

(51) Int. Cl.
*G01K 1/00* (2006.01)
*G01K 7/00* (2006.01)
(52) U.S. Cl. ...................................... 374/208; 374/163
(58) Field of Classification Search .................. 374/163, 374/208
See application file for complete search history.

(56) References Cited

U.S. PATENT DOCUMENTS

| | | | |
|---|---|---|---|
| D308,172 S | 5/1990 | Ishikawa et al. | |
| 5,829,878 A * | 11/1998 | Weiss et al. | 374/163 |
| 7,213,969 B2 * | 5/2007 | Russak et al. | 374/208 |
| 2004/0233970 A1 * | 11/2004 | Conforti | 374/208 |
| 2005/0080354 A1 * | 4/2005 | Crossley | 600/549 |
| 2006/0062276 A1 * | 3/2006 | Conforti | 374/163 |
| 2006/0291535 A1 * | 12/2006 | Craig et al. | 374/208 |
| 2007/0104246 A1 * | 5/2007 | Tseng | 374/163 |
| 2008/0080593 A1 * | 4/2008 | Lane et al. | 374/208 |

FOREIGN PATENT DOCUMENTS

JP          7286905          10/1995

* cited by examiner

*Primary Examiner*—Gail Verbitsky
*Assistant Examiner*—Mirellys Jagan
(74) *Attorney, Agent, or Firm*—Cermak Kenealy Vaidya & Nakajima LLP

(57) ABSTRACT

The disclosed subject matter relates to a clinical thermometer that facilitates easy measurement operation while suitably illuminating a location where a probe is to be inserted. Measurement can be performed even while subjects wear a garment. The clinical thermometer can include the following: a main body having on the outer face thereof a display for temperature display and a housing that includes a measuring device configured for temperature measurement; and an elongated probe part extending from the main body in a first direction and including a temperature sensing device located at the tip of the probe part that abuts against a user's armpit. The clinical thermometer can include, in the region where the main body is joined to the base of the probe part, a shoulder part curved or bent in a direction that intersects the first direction. The main body can also include an illumination device configured to emit light in the direction along which the probe extends. The illumination device can be configured for specific use at a particular body part, e.g, armpit, and such that it does not protrude beyond the main body.

17 Claims, 6 Drawing Sheets

F I G.5
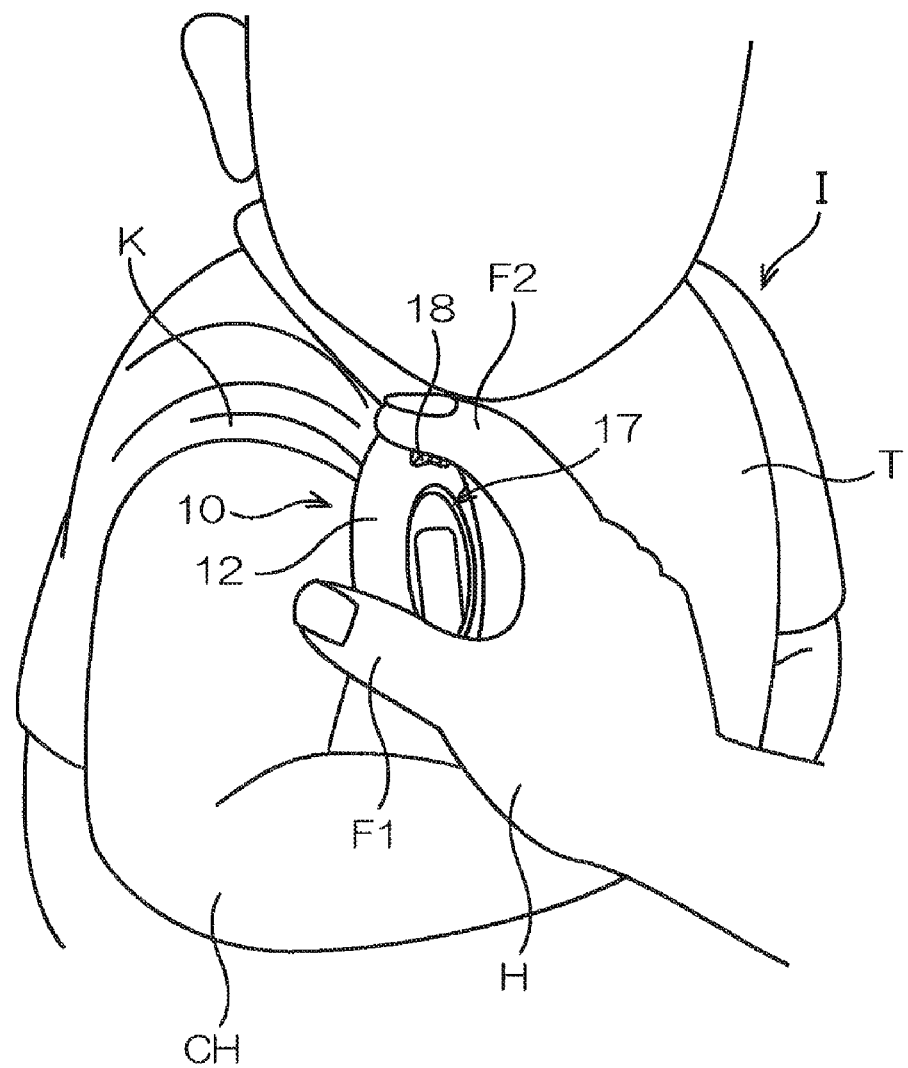

FIG.7
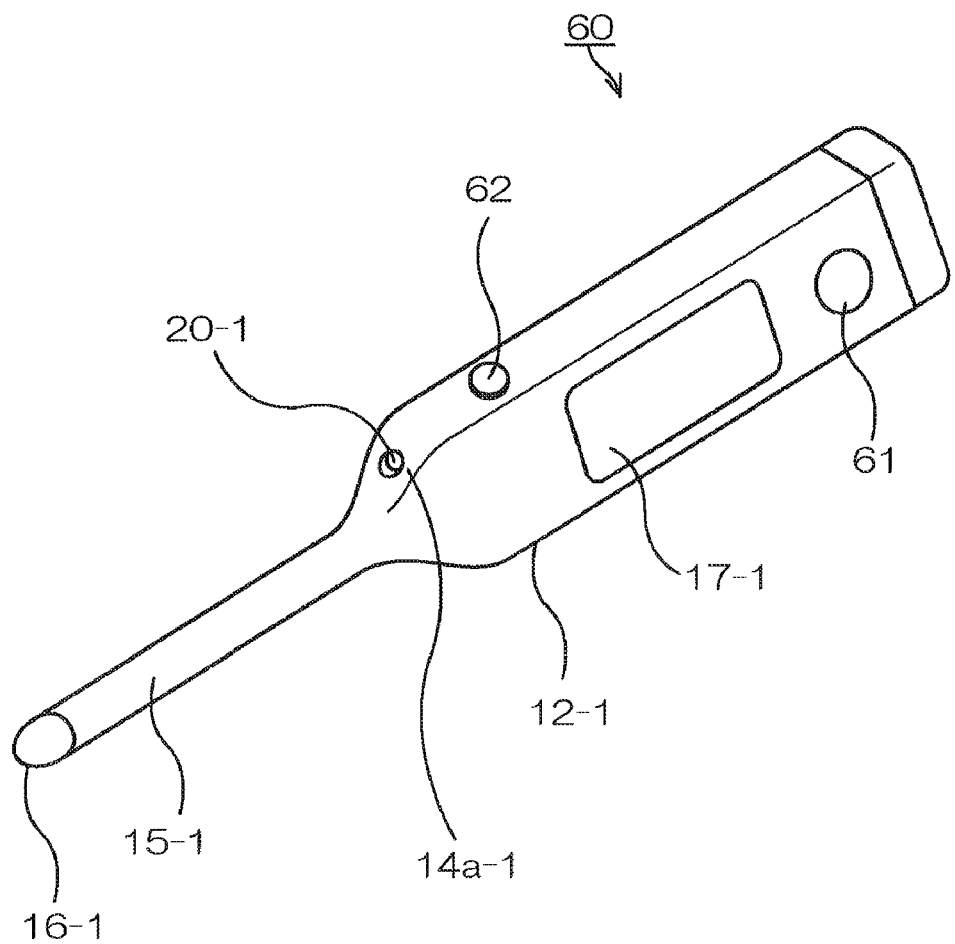
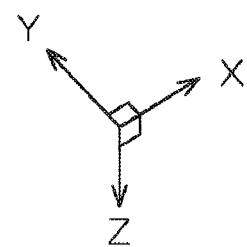

CLINICAL THERMOMETER

This application is a National Stage application filed under 35 U.S.C. §371 of PCT/JP2005/020944 filed on Nov. 15, 2005 which claims priority to Japanese Patent Application No. 2004-346586 filed on Nov. 30, 2004, which are both hereby incorporated in their entirety by reference.

BACKGROUND

1. Field

The presently disclosed subject matter relates to a clinical thermometer for measuring body temperature by inserting a probe under an armpit, and more particularly, to a clinical thermometer typically used by an attendant.

2. Description of Conventional Art

Clinical thermometers for measuring body temperature by inserting a probe under an armpit are widely used. Such clinical thermometers include, for instance, clinical thermometers used by an attendant such as a mother, a nurse or the like for measuring the temperature of an infant, an elderly person, a patient or the like.

When using such a clinical thermometer, the probe abuts against a position under the armpit of the subject to be measured. At that time it is possible to perform the measurement while also securing the abutting position under the armpit by visual confirmation.

When the infant or the like is in poor health, body temperature is often measured not only during the day but also during the night, in a bedroom or the like. In that case, for convenience, the probe may be set at an appropriate position by being inserted while illuminating the underside of the armpit.

A clinical thermometer having such an illumination function is known. (See for example Japanese Unexamined Patent Application Laid-open No. H07-286905)

The above-described conventional clinical thermometer having an illumination function includes a thin elongated arm-like light mounting portion extending from the main body in the vicinity of the probe, this light mounting portion is at a position removed from the probe extending from a main body in one direction as a separate object, such that illumination light issuing from the tip of the light mounting portion illuminates around the location where the probe is inserted.

SUMMARY

To afford convenient portability, a clinical thermometer used for such applications can be formed to be small and lightweight. As a result, it is difficult to illuminate the entire surroundings of the probe insertion location through the use of considerable light supplied by a large electric current. Accordingly, it is helpful to efficiently use a reduced amount of light from a small light source, and hence, it is helpful to arrange the illumination light source at an extended position close to the illumination location by means of an arm-like light mounting portion such as the one described above.

However, the above clinical thermometer is problematic in that, for an accurate measurement, body temperature is ordinarily measured under the armpit, with the measurement subject wearing a garment such as a nightgown or the like. In addition, the sleeve portion of the garment is often turned up so as to expose the vicinity of the underside of the armpit, whereby part of the garment may be present in the vicinity of the insertion location of the probe. As a result, the thin and long arm-like light mounting portion extending as described above often gets caught in part of the garment, thereby hampering the measurement operation. In addition, part of the garment may cast a shadow that hinders the illumination that accompanies the measurement operation.

That is, the above-mentioned conventional example is essentially an ear-type eardrum clinical thermometer that is provided with an illumination function. Hence the use of such a clinical thermometer, which is arguably not affected by the above-described relationship between a clinical thermometer and a garment, does not afford any measures for countering the above problems.

In order to solve the above-described and other problems and address certain long sought needs in the field, the disclosed subject matter can provide a clinical thermometer that allows easy measurement operations while suitably illuminating a location where a probe is to be inserted. The device can be used for measurement even when a subject is wearing a garment.

The above goal can be achieved by a first embodiment of the disclosed subject matter in which a clinical thermometer can include: a main body having on the outer face thereof that includes display means for temperature display and housing at least one portion of measuring means for temperature measurement; and an elongated probe part that extends from the main body in a first direction and including at the tip of the probe part a temperature sensing part that abuts against a user's armpit, the clinical thermometer further including, in a region where the main body is joined to the base of the probe part, a curved or bent shoulder part in a direction that intersects the first direction. The main body can also include an armpit illumination device (e.g., means for emitting illumination light in the direction along which the probe extends), the armpit illumination device can be configured so as not to protrude beyond the main body.

In the constitution of the first embodiment of the disclosed subject matter, the armpit illumination device can be provided in the main body having a shoulder part curved or bent in a direction that intersects the direction along which the probe part extends. The armpit illumination means, moreover, can be configured so as not to protrude beyond the main body, and to be formed integrally with the main body; as a result, occurrences of the armpit illumination device getting caught with a garment, which hampers the measurement operation, can be prevented even when the measurement subject is wearing a garment.

Accordingly, the disclosed subject matter provides a clinical thermometer that allows an attendant to perform measurements by bringing into contact the temperature sensing part against an appropriate position under an armpit while suitably illuminating the location where the probe is to be inserted. The device can be used with measurement subjects that are wearing a garment.

A second exemplary embodiment of the disclosed subject matter has a constitution similar to the first embodiment of the disclosed subject matter described above, and is characterized in that the armpit illumination device is provided at a location in the vicinity of the shoulder part or of the probe part.

In the second embodiment of the disclosed subject matter, the optical axis of the armpit illumination means is brought closer to the probe part, to provide a first, different effect. Thus, the optical axis becomes less likely to be disturbed by the garment or the like of the measurement subject. As a second effect, the optical axis of the armpit illumination device is protected from being disturbed by a hand or finger gripping around the edge of the main body, for example, when an attendant performs a measurement by holding the main body with his/her hand.

A third embodiment of the disclosed subject matter has a constitution similar to any of the first or second embodiments of the disclosed subject matter, and is characterized in that the probe part is formed to extend slightly obliquely in a horizontal or perpendicular direction relative to the longitudinal direction of the main body. The direction along which the probe part extends intersects with the optical axis of the armpit illumination device.

In the constitution of the third embodiment of the disclosed subject matter, the probe part slants slightly relative to the longitudinal direction of the main body, and hence, the temperature sensing part at the tip of the probe part can adequately abut against the measurement point under the armpit during insertion of the probe part under the armpit. Since the direction along which the probe part extends is oblique and intersects with the optical axis of the armpit illumination means, the measurement point is adequately illuminated, while the probe part can be easily positioned by simply being oriented in the illumination direction.

A fourth embodiment of the disclosed subject matter can be similar to any of the first through third disclosed subject matters, and is characterized in that the main body is formed in a substantially flat shape. The display is provided on one face of the main body, the probe part extends from a second face of the main body, and the shoulder part formed on the second face is configured to restricts the extent of insertion when the probe is inserted under the armpit of a user.

In the constitution of the fourth embodiment of the disclosed subject matter, the insertion depth of the probe part under the armpit of a subject to be measured is determined, and the appropriate measurement point of the temperature sensing part at the tip of the probe part becomes positioned, by causing the shoulder part to abut the front face of the body that corresponds to the underside of the armpit of a subject to be measured. Since, moreover, the probe part extends from the other face of the flat main body, hardly any position shift occurs even when the body of the measurement subject such as an infant or the like moves during measurement.

A fifth embodiment of the disclosed subject matter can be similar to any of the first through fourth embodiments of the disclosed subject matter, and can include a switch for starting the operation of the temperature measurement, and the armpit illumination device can be turned off after being lit for a predetermined time, through the operation of the switch.

In the constitution of the fifth embodiment of the disclosed subject matter, initiation of the measurement and illumination under the armpit for the measurement are carried out through a one-action operation of the switch, which makes usage more convenient. Further, the attendant thereby needs less time for arranging the clinical thermometer at the measurement position. As described above, the armpit illumination device can be configured to turn off after a corresponding predetermined time has elapsed, which prevents wasteful battery consumption.

A sixth embodiment of the disclosed subject matter can be configured similar to any of the first through fifth embodiments of the disclosed subject matter, and can include a backlight illumination device for illuminating (and thereby facilitating viewing of) the display. The backlight illumination device can be configured to distribute light from a light source shared by the backlight illumination device and the armpit illumination device.

In the constitution of the sixth embodiment of the disclosed subject matter, viewing of the display can be considerably easier, and measurement can be carried out easily in the dark with the armpit illumination device since the display is illuminated by the backlight illumination device. The double use of the light source for both armpit illumination and for back illumination affords an effective utilization of the restricted space of the main body, as well as an effective utilization of the battery.

BRIEF DESCRIPTION OF THE DRAWINGS

FIG. 5 is a diagram illustrating the clinical thermometer of FIG. 1 during use;

FIG. 7 is a schematic perspective view of a third embodiment of a clinical thermometer made in accordance with principles of the presently disclosed subject matter.

DESCRIPTION OF EXEMPLARY EMBODIMENTS

Exemplary embodiments of the presently disclosed subject matter are explained in detail next with reference to relevant accompanying drawings. The embodiments described below are suitable specific examples of the presently disclosed subject matter, and hence include various technical features. However, the scope of the disclosed subject matter is not meant in any way to be limited to or by these embodiments.

Figure 1:
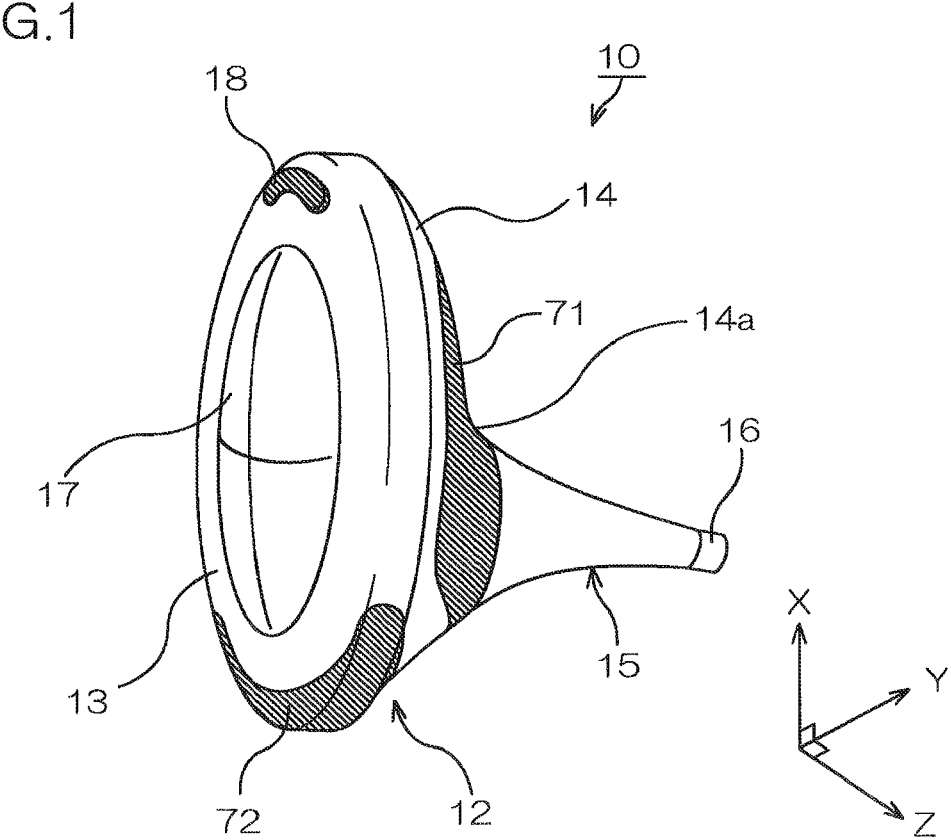
FIG. 1 is a schematic perspective view of a first embodiment of a clinical thermometer made in accordance with principles of the presently disclosed subject matter.
Figure 2:
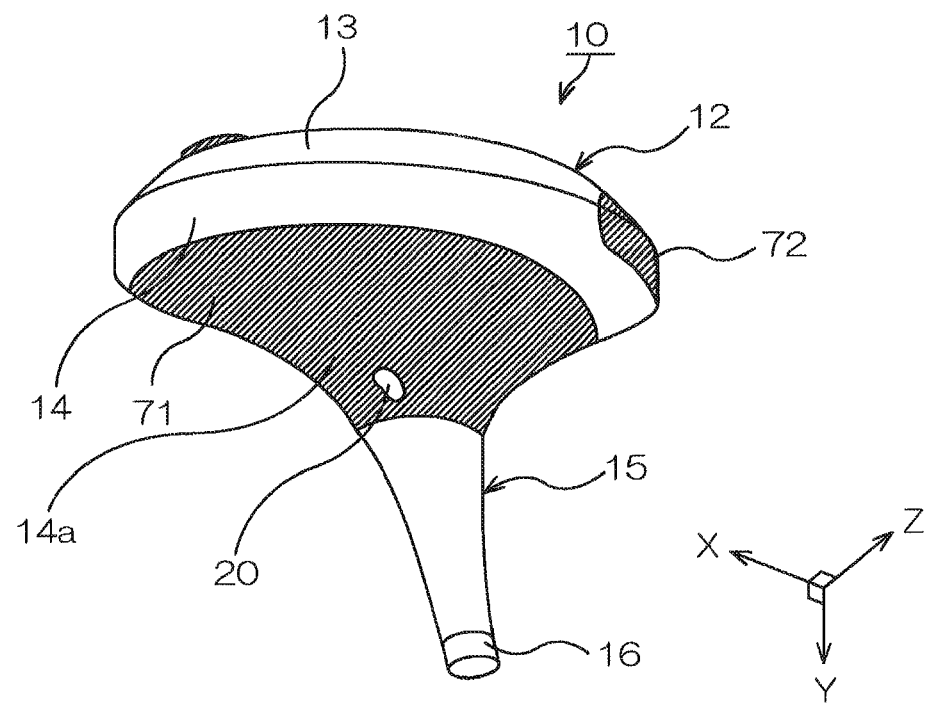
FIG. 2 is a schematic perspective bottom view of the clinical thermometer of FIG. 1.
Figure 3:
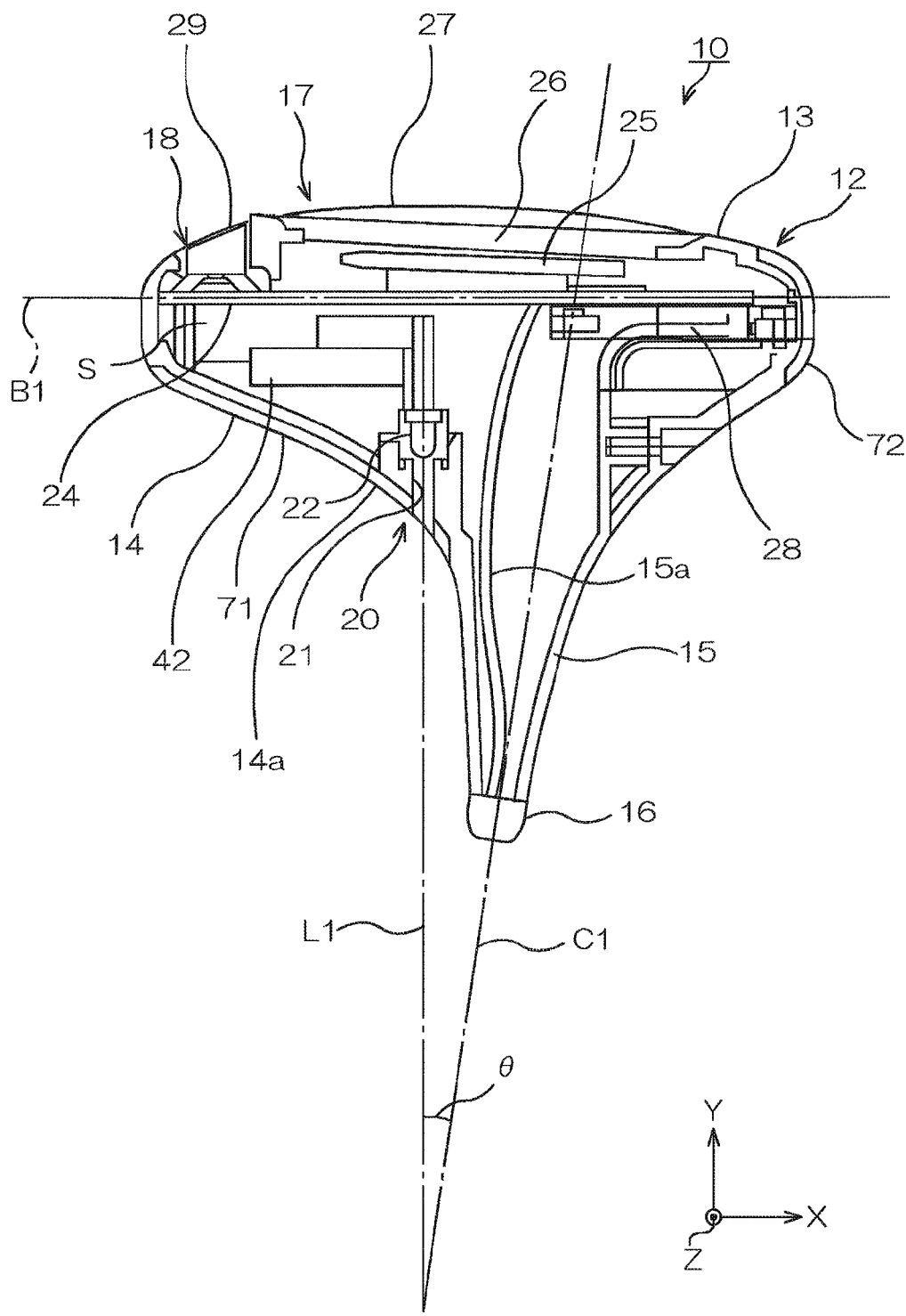
FIG. 3 is a schematic cross-sectional diagram of the clinical thermometer of FIG. 1.

FIG. 1 is a schematic perspective-view illustrating an embodiment of a clinical thermometer 10 made in accordance with principles of the presently disclosed subject matter, viewed from the side of a first face 13; FIG. 2 is a schematic perspective-view illustrating the clinical thermometer 10 of FIG. 1, as viewed from a second face 14; and FIG. 3 is a schematic cross-sectional diagram of the clinical thermometer 10 of FIG. 1.

As illustrated in the figures, the clinical thermometer 10 can include a main body 12 for housing a mechanism, and an elongated probe part 15 extending in a first direction from the second face 14 that opposes the first face 13 of the main body 12. An armpit illumination device 20 can be provided at a predetermined position of the second (other) face 14 of the main body 12, and will be described in more detail below.

The main body 12 can be, for example, a hollow case made of a synthetic resin molded product of ABS resin, AS resin, polypropylene, polystyrene, polymethyl methacrylate or the like. In the presently described embodiment the main body 12 is formed as a substantially oval or ellipsoidal flat shape elongated in the X direction of the figure. The slim probe part 15 extends from the second face 14 of the main body 12, in the longitudinal direction of the main body 12, i.e. a direction intersecting the X direction in the figure, and extending away from the second face 14. The probe part 15 has a hollow capsule shape in this embodiment, and can include a temperature sensing part 16 located at a closed tip thereof. As described below, the center axis of the probe part 15 can extend slightly obliquely.

As illustrated in FIG. 2, an R-shaped curved or bent shoulder part 14a is formed on the second face 14 of the main body 12, and on the region that joins with the base of the above-described probe part 15. That is, the shoulder part 14a is a region that surrounds the location of the second face 14 of the main body 12 that is joined to the probe 15, and is shaped as a bent or curved cone that has a narrowing width from the second face 14 of the main body 12.

In the above-described embodiment, the armpit illumination device 20 of the second face 14 of the main body 12 is formed integrally with the main body 12 at the location of the shoulder part 14a, i.e., in the vicinity of the base of the probe part 15.

As illustrated in FIG. 3, a base plate 24 can be arranged along the X direction so as to separate the inner space S of the main body 12 into a first face 13 side and a second face 14 side. The base plate 24 can be a wiring board having appropriate electrical wiring.

As illustrated in the figure, the probe part 15 extends substantially in the Y direction, below the base plate 24. Herein, the base of the probe part 15 is arranged at an eccentric position, somewhat to the right (to the underside, during measurement) of the main body 12. Also, the probe part 15 extends in the longitudinal direction B1 (same as the X direction) of the main body 12, with the hypothetical center axis of the probe part 15 slanting slightly inward.

A temperature sensor 161 is housed in the temperature sensing part 16 at the tip of the probe part 15. A thermistor may be used as the temperature sensor. The (electrical) resistance of a thermistor changes in accordance with temperature changes, and changes in the resistance values of the thermistor being herein transmitted via the base plate 24, as described below. The temperature sensor may use instead, for instance, an IR (Infrared Ray) thermopile sensor. Specifically, an IR beam that is incident on the temperature sensing part 16 raises the temperature of a first contact point of a thermopile, whereupon electrical potential changes as a result of a thermoelectric effect, based on the temperature difference relative to a second contact point. This potential is transmitted via wiring 15a to the base plate 24 connected to the temperature sensor.

In the inner space S of the main body 12, for instance, a buzzer 42 that can be used as a warning means, and/or a battery 28 that can be used as a power source can be housed.

In FIG. 3, components that constitute the display 17 are housed higher up than the base plate 24, i.e. in a space on the side of the first face 13. The display 17 can include various types of displays that are capable of displaying temperature, for instance, a liquid crystal display, an EL (electroluminescent) display, an LED (light-emitting diode) display or the like. In the embodiment of FIG. 3, a liquid crystal display is used.

The display 17 can include a liquid crystal element (liquid crystal cell) 25, a cover 26 thereof, and a lens 27 having an outward convexly curved outer shape, arranged outside the cover 26. The lens 27, which is the outermost layer on the side of the display 17 and, as illustrated in FIG. 3, is shaped as a curved surface, enlarges and enhances the visibility of the liquid crystal, and widens the angle of vision thereof. When arranged below the first face 13, the lens 27 makes it hard to keep the main body 12 standing. The liquid crystal element 25 is connected to the base plate 24, and on the first face 13 on the side of the display 17, there is arranged a switch 18 being one end of the base plate 24. The switch 18 is constructed, for instance, as a push-button switch that can include a key top 29 made of an elastomer or the like, and a contact point arranged on the base plate 24 and which opens and closes as a result of the operation of the key top 29. The switch 18 can be configured as a single switch, or a plurality of switches that are selectively operable.

In the inner space S of the main body 12, a light source 22 can be provided in the vicinity of the base of the probe part 15. An illumination window 21 can be provided through which light from the light source 22 passes and is led out. Herein, the light source 22 and the illumination window 21 form the illumination device 20. In the presently described embodiment, a semiconductor LED can be used as the light source 22, so as to obtain the desired brightness using little energy.

The light source 22 is fixedly arranged parallel to the Y direction in FIG. 3, and the illumination window 21 is also parallel to the Y direction. In other words, the light source 22 is formed in such a way that the optical axis L1 runs along a direction substantially perpendicular to the longitudinal direction B1 of the main body 12. The illumination window 21 opens onto the second face 14 of the main body 12 in the vicinity of the base of the probe part 15.

As a result, the optical axis L1 from the light source 22 is intersected, forming an angle θ, by a hypothetical prolongation of the direction C1, along which the hypothetical center axis of the probe part 15 extends. Specifically, the illumination window 21 opens in the vicinity of the base of the probe 15, without protruding, on the same side of the oblique direction along which the probe part 15 extends. The elongation axis of the probe part 15 slants at an angle θ with respect to the optical axis. The temperature sensing part 16 of the tip can also tilt at the angle θ with respect to the optical axis. The illumination device 20 is provided in the shoulder part 14a on the inside of the slanting probe part 15, and can be configured for use under an armpit of a patient or subject.

A condensing lens may also be arranged, for instance, integrally with the LED that is the light source 22, or halfway along the illumination window 21, to condense illumination beams, thereby increasing the amount of illumination light directed to a restricted region, in such a way so as to selectively provide bright illumination to the position of the measurement point.

As illustrated in FIGS. 1 and 2, a temperature buffer region 71 is provided on the outer face of the main body 12. The temperature buffer region 71 is formed as a region of the second face 14 of the main body 12 that is configured for contact with the front face of the body of the measurement subject during the below-described body temperature measurement. The temperature buffer region 71 can be formed, for instance, of an elastomer or the like, and is formed on the above region of the main body 12 through integral molding such as two-color molding, insert molding or the like. Similarly, an elastomer can be arranged on the region surface denoted by the reference numeral 72. The elastomer dampens impacts, prevents slip, and is ornamental, among other effects, and can also provide the attendant with a yardstick for the extent of insertion under the armpit or other portion of the subject.

Figure 4:
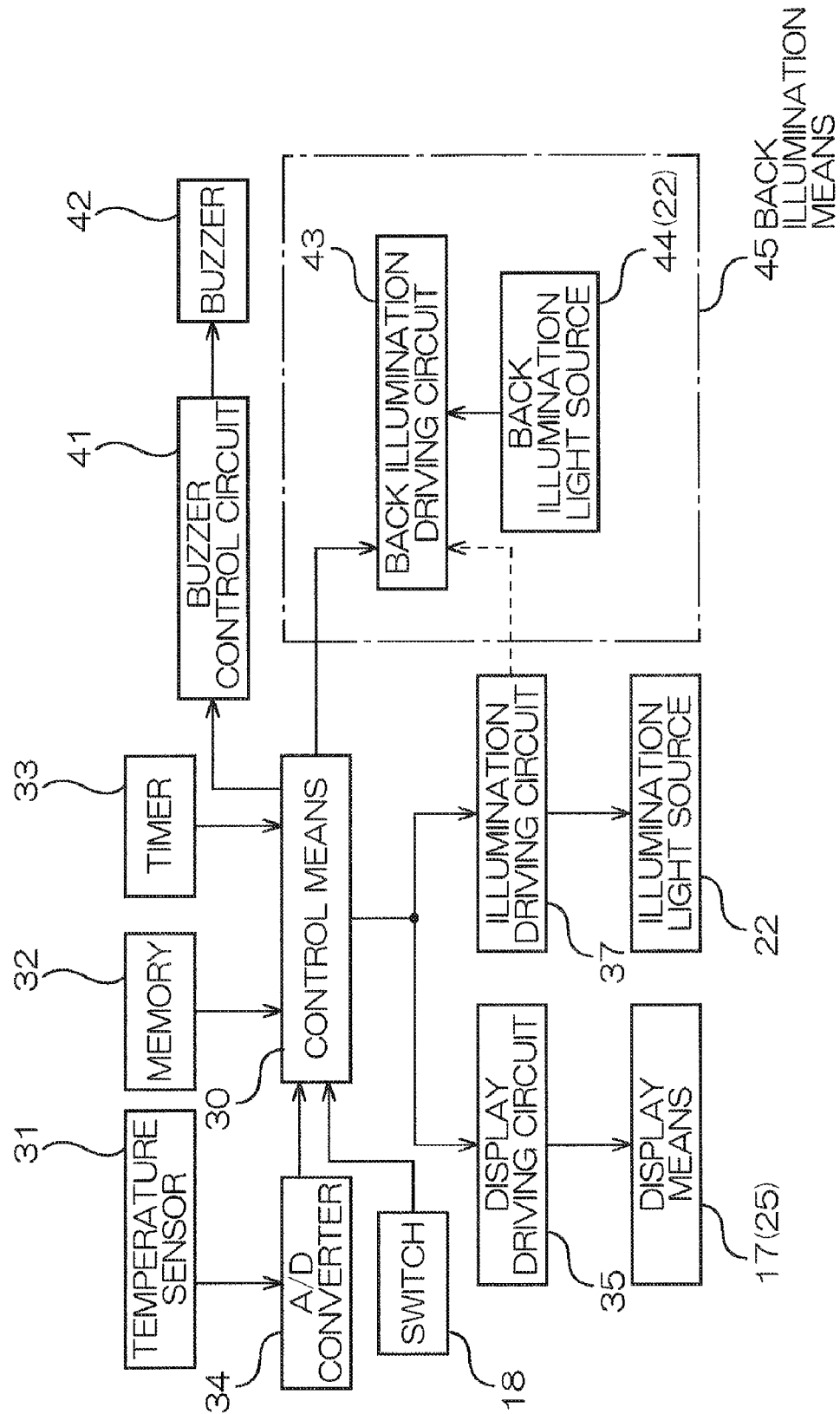
FIG. 4 is a block diagram illustrating an electrical constitution of an embodiment of a clinical thermometer made in accordance with the presently disclosed subject matter.

FIG. 4 is a block diagram illustrating the electrical constitution of the clinical thermometer 10 and includes the components inside the main body 12 and the base plate 24.

In the figure, the control device 30 is for instance a CPU or, in lieu thereof, a control circuit, integrated as a semiconductor or the like, mounted on the base plate 24. The control device 30 controls various electric constitutions as well as the desired computations during temperature measurement (body temperature measurement) that is launched when the switch 18 is switched on. A memory 32 is connected to the control device 30. The memory 32, which includes a storage device such as a ROM, RAM or the like, holds software and/or data that can be used for operations such as measurement. Alternatively, the memory 32 may include memory that acts as a work area for writing at any time during operation. A timer 33 is a time measurement device used for below-described operations that use time measuring.

A temperature sensor 31 can include the above-described thermistor or the like, and hence the change in the resistance value outputted by a thermistor as the temperature sensor 31 is converted into a digital signal by an analog/digital conversion device 34, and is inputted to the control device 30. The control device 30 computes the measured temperature on the basis of these input signals.

A display driving circuit 35 that drives the liquid crystal element 25 of the display 17 can be connected to the control device 30 so as to display results computed by the control device 30. The armpit (or other body part) of the measurement subject can be illuminated during temperature measurement, and hence an illumination driving circuit 37 is connected to the control device 30. The illumination driving circuit 37 drives the light source 22 of the illumination device 20. The control device 30 can also include a buzzer control circuit 41 for driving the buzzer 42 as the warning means. The back illumination mechanism 45 of FIG. 4 is not provided in the clinical thermometer 10 of the first embodiment, and hence it will be explained in relation to the below-described second embodiment.

A power source corresponding to the battery 28 of FIG. 3 can be connected to each driving circuit, but has been omitted in some figures so to the drawings can be easily understood. The various electrical constitutions that comprise the control device 30 may be connected to a predetermined bus line.

A method for using the clinical thermometer 10 of the present embodiment having the above constitution is explained next with reference to FIG. 5 and other figures.

The measurement subject I, such as an infant or a patient, wears a garment T that remains on the subject.

The illumination device 20 emits illumination light when an attendant such as a mother or a nurse operates the switch 18 of the clinical thermometer 10 of FIG. 3 to start the clinical thermometer 10. Guided by this illumination, the attendant inserts the probe part 15 of the clinical thermometer 10 of FIG. 3, for example, under the armpit of the measurement subject I, and places the temperature sensing part 16 at the measurement position under the armpit. Since the main body 12 is flattened, the attendant can reliably hold the clinical thermometer 10.

In FIG. 5, the garment is turned up, through the rolling up of a sleeve K, or through unfastening of a button, so as to expose the underside of the armpit of the measurement subject I, where the measurement is carried out. In addition, the attendant grips the main body 12 with a hand H, adjusts the orientation of the probe part 15 of the clinical thermometer 10 so that the oblique direction in FIG. 3 slants upwards, and inserts the temperature sensing part 16 located at the tip of the probe part 15 under the exposed armpit of the measurement subject I.

When body temperature measurement is carried out during the night in a bedroom or a hospital room with the lights out, for instance when the health condition of the measurement subject I is poor, operations such as rolling up the sleeve K of the garment T to expose the underside of the armpit, where measurement is to take place, are typically performed in such a way that the protruding probe part 15 does not get caught in the sleeve K or the like of the garment. Therefore, the illumination device has typically been embodied as a thin, protruding structure separated from the probe part 15. However, the protruding illumination device sometimes gets caught in the sleeve K or the like. In addition, attention should be paid so as to avoid shading the thermometer with the sleeve K or the like.

In the illumination device 20 of the embodiment shown in FIG. 3, by contrast, light is irradiated out of the illumination window 21 that opens to the surface of the main body 12, without the illumination device 20 protruding from the surface of the main body 12, and hence the above inconveniences can be avoided, thus facilitating the measurement operation. Moreover, the illumination device 20 can be arranged on the shoulder part 14*a* that is the base of the probe part 15, so that there is little light blockage on account of the sleeve K or the like.

In this situation, moreover, as explained in FIG. 3, the probe part 15 points upwards tilting at an angle θ, and thus upon insertion of the probe part 15 under the armpit, the probe part 15 can be easily inserted deeply and without positional shift, up to the measurement position under the armpit that is slightly above the insertion position. As illustrated in FIG. 3, the shoulder part 14*a* of the main body 12 is substantially curved at the base of the probe part 15. Hence, when this location abuts against a front position of the body (for example, the underside of the armpit of the measurement subject I), the length of the probe part 15 can be configured to exactly reach under the armpit. This allows easily determining the insertion depth of the probe part 15, while positional shift can be prevented, even when the body of the measurement subject I moves, thanks to the slip prevention effect of the temperature buffer region 71 and thanks to the main body 12 being flattened and shaped so as to fit the body.

In such an operation, the illumination device 20 has an optical axis that intersects the direction along which the probe part 15 extends, slightly ahead of the tip of the probe part 15, as explained in FIG. 3. Accordingly, inserting the probe part 15 results in illuminating the position where the temperature sensing part 16 should abut.

In the present embodiment, moreover, the illumination window 21 of the illumination device 20 can be provided in the vicinity of the base of the probe part 15, as explained in FIG. 3. This allows reducing the possibility that part of the garment T of the measurement subject I could block the optical axis of the illumination device 20. That is, when the illumination window 21 of the illumination device 20 is away from the base of the probe part 15, there is an increased likelihood that, even if the probe part 15 can be inserted through a gap in the garment, part of the garment may become interposed along the optical path, which is away from the insertion location, thereby obstructing the optical path. The present embodiment eliminates such an inconvenience.

Moreover, as illustrated in FIG. 5, the attendant holds the main body 12 with the hand H, and upon temperature measurement, presses the side faces of the main body 12 with the thumb F1 and the middle finger not shown in the figure. Herein, when the index finger F2 is positioned at the end of the main body 12 (the uppermost position of the main body 12 in FIG. 5), the index finger F2 may slip around the end of the main body 12, covering the rear thereof. In such a case, when the illumination window 21 of the illumination device 20 is away from the base of the probe part 15, the index finger F2 may come to cover the opening of the illumination window 21, whereby the attendant his/herself ends up blocking the optical path of the illumination device 20. In order to prevent such an occurrence, the illumination window 21 of the illumination device 20 can be provided in the vicinity of the base of the probe part 15. Also, the switch 18 is arranged to be positioned below the index finger F2, thereby facilitating the operation of the switch 18. The device can be employed not only in the direction illustrated in FIG. 5, but measurements can also be carried out with the measurement subject I asleep, or held in arms. Of course, the measurement subject I can use the device by his/herself.

An example of the measurement process is explained next.

As described above, when the switch 18 of the clinical thermometer 10 is pressed, the display 17 changes from an all-on display (all the segment displays on) to a display of the last measured value.

Simultaneously with this operation, the illumination device 20 lights up, and the control device 30 measures time using the timer 33 and performs lighting for a predetermined time, for instance 5 seconds. The probe part 15 can be inserted under the armpit, for example, of the measurement subject I within this predetermined time, and the temperature sensing part 16 of the probe part 15 is positioned to abut the underside of the armpit. By switching the light off after a predetermined time has elapsed, the illumination device 20 prevents wasteful battery consumption.

Next, characters such as "L" or "° C." blink on the display 17 to notify a user that temperature check preparations have been completed, and the timer 33 is started. The armpit of the measurement subject I should then close and the probe part 15 should be pressed firmly. A preliminary temperature check begins upon detection of (contact with) the human body, based on the function of the temperature sensing part 16. Then, after a predetermined time lapse, for instance 30 seconds, the control device 30 issues a command to the buzzer control circuit 41 that causes the buzzer 42 to buzz, thereby notifying the end of the temperature check.

After reading the body temperature display on the display 17, the attendant switches the power source off by pushing the switch 18.

Even if the switch 18 is not operated, the timer 33 continues measuring time, so that if the device is left untouched for a predetermined lapse of time, for instance about 3 to 4 minutes, the timer 33 informs the control device 30 that the predetermined time has run out, whereupon the power source is automatically switched off so as to prevent unnecessary power consumption.

As explained above, the clinical thermometer 10 of the first embodiment can include the illumination device 20 provided on the main body 12 having a shoulder part 14a curved or bent in a direction that intersects the direction along which the probe part 15 extends. The illumination device 20 can be configured in such a way so as not to protrude beyond the main body 12. As a result, an occurrences in which the illumination device 20 is caught with a garment, and which hampers the measurement operation, can be prevented even when the measurement subject I is wearing a garment.

A clinical thermometer can thus be provided that allows an attendant to perform a measurement operation easily while adequately illuminating the location where the probe part 15 is to be inserted.

Figure 6:
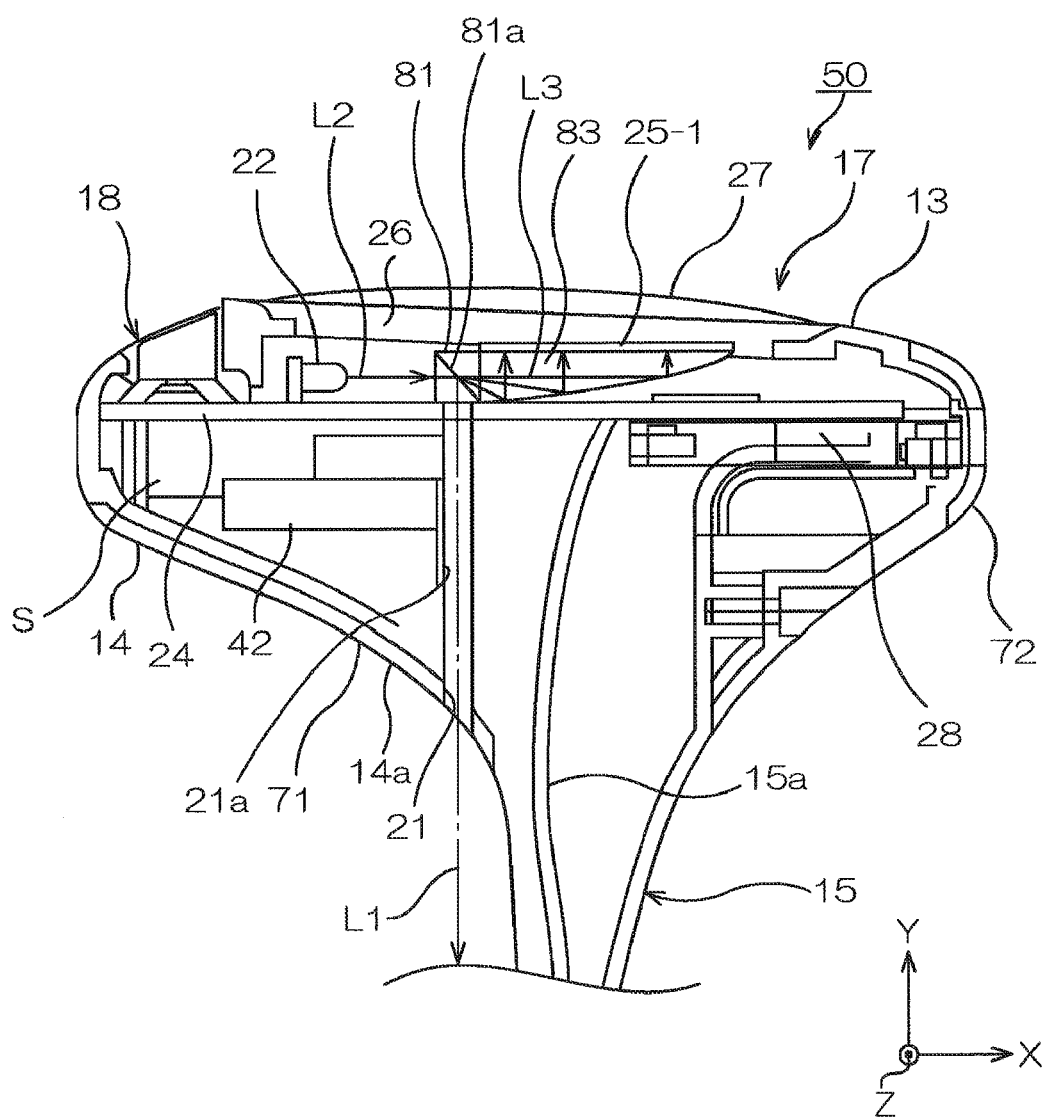
FIG. 6 is a schematic cross-sectional view diagram of a second embodiment of a clinical thermometer made in accordance with principles of the presently disclosed subject matter.

FIG. 6 is a schematic cross-sectional diagram illustrating a second embodiment of a clinical thermometer.

In the figure, parts that are similar or identical to those of the clinical thermometer 10 of the first embodiment are denoted with the same reference numerals, and their explanation is omitted herein.

The clinical thermometer 50 of the second embodiment differs from the clinical thermometer 10 of the first embodiment in that the display is provided with a back illumination device.

In the clinical thermometer 50, the light source 22 is arranged in the vicinity of the end of the base plate 24. The light source 22 can be mounted so as to emit illumination light in the X direction.

A light splitting structure such as beam splitter 81 or the like, can be provided adjacent the light source. A light splitting film 81a can be provided that includes a half mirror for splitting the entire incident light into one half reflected light and one half transmitted light. A light guide 83 can be arranged in the emission direction of the transmitted light, the light guide 83 being fixed to the base plate 24 by some predetermined means. A liquid crystal element 25-1 can be arranged above the light guide 83, the liquid crystal element 25-1 being fixed to the side of the cover 26.

The optical path of the light split by the light splitting film 81a of the beam splitter 81 passes through the optical channel 21a, which extends vertically along the Y direction in FIG. 6, and exits through the illumination window 21. An appropriate glass material may be arranged on, or filled into, the optical channel 21a, and a condensing lens may also be arranged in the vicinity of the illumination window 21.

The light guide 83 is, for instance, a plate made of a transparent synthetic resin such as an acrylic resin or the like. And the light guide 83 is a light-guiding object. The underside of the light guide 83 can be bent into a curved shape, in such a way that the critical angle causes incident light to be reflected upwards. As a result, the light incident from the left end of the light guide 83 is diffused/reflected, which allows for backlighting of the liquid crystal 25-1 in a planar and even manner. As illustrated in FIG. 4, the second embodiment can include an additional back illumination device 45, formed in an electrical circuit, and connected to the control device 30 or to the illumination driving circuit 37 of the illumination device 20. The back illumination driving circuit is connected to a back illumination light source 44. However, the light source 22 of the illumination device 20 explained in the first embodiment can be used as the back illumination light source 44.

The back illumination driving circuit 43 may light up the back illumination light source 44 independently, as a result of an instruction by the control device 30, or may be connected to the illumination driving circuit 37 of the illumination device 20 so as to elicit lighting and extinguishing simultaneously with the lighting of the illumination device 20.

In the clinical thermometer 50 of the second embodiment having the above constitution, light L2 emitted by the light source 22 impinges on the beam splitter 81. The transmitted light L3 that passes through the light splitting film 81a of the beam splitter 81 impinges on the light guide 83, is diffused and reflected by the inner face, is guided upwards, and becomes incident over a planar area on the rear side of the liquid crystal element 25-1. The liquid crystal element 25-1 is thus planarly illuminated from the rear side thereof, whereby the visibility of the display 17 increases dramatically.

In the light L2 emitted by the light source 22, meanwhile, the light L1 reflected by the light splitting film 81 a passes through the optical channel 21 a, and exits through the illumination window 21, to allow illuminating of the subject, e.g., under the subject's armpit.

Thus, the clinical thermometer 50 of the second embodiment can be configured to achieve the same or a similar effect as the clinical thermometer 10 of the first embodiment, while, thanks to the illumination by the backlight illumination device, the display 17 can be read very easily. Moreover, the double use of the light source 22 of the illumination device 20 for both back illumination and illumination of the subject affords an effective utilization of the restricted space of the main body 12, and effectively utilizes the battery.

The transmission/reflection ratio of the light splitting film of the beam splitter 81 is not limited to 1/2. The ratio can be suitably modified in accordance with the amount of light needed or desired for backlighting and for illuminating the subject. Instead of a shared light source for backlighting and illumination of the subject, there may be provided separate light sources for respective purposes.

FIG. 7 illustrates a third embodiment of a clinical thermometer. Although the overall shape of a clinical thermometer 60 of the third embodiment differs from that of the clinical thermometer 10 of the first embodiment, the basic constitution of both is similar. The differences are explained below.

In FIG. 7, the clinical thermometer 60 has a substantially rectangular main body 12-1 elongated in the X direction, and includes a display 17-1 on the outer face of the main body 12-1, for temperature display. The components that constitute the measurement device for temperature measurement are housed in the main body 12-1, as in the first embodiment.

The clinical thermometer has an elongated probe part 15-1 extending from one end of the main body 12-1 along the X direction (longitudinal direction of the main body) that is parallel to the horizontal direction. A temperature sensing part 16-1 that can be configured to abut a portion of the subject, such as the underside of the armpit of the measurement subject, can be located at the tip of the probe part 15-1.

In the region where the main body 12-1 is joined to the base of the probe part 15-1, there is formed a shoulder part 14*a* curved or bent in a direction Z that intersects the X direction. In this shoulder part 14*a* there is provided an illumination device 20-1. The illumination device can be configured in such a way so as not to protrude beyond the main body 12-1, and for emitting illumination light along the X direction that is the direction along which the probe part 15-1 extends.

A switch 61 for launching the temperature measurement operation is provided on the main body 12-1, on the same face as the face whereon the display 17-1 is formed. A switch 62 for lighting up/extinguishing the illumination device 20-1 can be provided separately in the vicinity of the illumination device 20-1.

Therefore, although the shape of the main body of the clinical thermometer 60 is different from that of the clinical thermometer 10 of the first embodiment, both share similar constructions, and hence the clinical thermometer 60 can achieve the same effect as the clinical thermometer 10 of the first embodiment.

The present invention is not limited to the above-described embodiments. As the case may require, each constitution in the above-described embodiments can be realized by being omitted in part, replaced by another constitution, or combined with other different constitutions.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

The invention claimed is:

1. A clinical thermometer comprising:
   a main body having an outer face, a display located at the outer face, and a housing that is configured to house at least a portion of a measuring device configured to measure temperature; and
   an elongate probe part extending from the main body in a first direction and having a tip, a temperature sensing part located at the tip of the elongate probe part, the temperature sensing part configured to abut against a portion of a human body, wherein
   said main body is joined to said probe part via a curved or bent shoulder part that extends in a direction that intersects said first direction,
   said main body includes an illumination device configured to emit light in a direction along which said probe extends, the illumination device located within the main body, wherein the illumination device includes a light source and an illumination window through which light from the light source passes and is led out of the main body, wherein the illumination window is an opening and is flush with the curved or bent shoulder of the main body, and
   said probe part extends obliquely with respect to one of a horizontal and a perpendicular direction relative to a longitudinal direction of said main body, and a longitudinal axis of said probe part intersects at a point with an optical axis of said illumination device.

2. The clinical thermometer according to claim 1, further comprising:
   a backlight illumination device configured to provide light to said display, wherein said backlight illumination device is configured to distribute light from a light source shared by said backlight illumination device and said illumination device.

3. The clinical thermometer according to claim 1, further comprising:
   a backlight illumination device configured to facilitate viewing of said display, wherein said backlight illumination device is configured to distribute light from a light source shared by said backlight illumination device and said illumination device.

4. The clinical thermometer according to claim 1, wherein the display includes means for displaying temperature information.

5. The clinical thermometer according to claim 1, wherein the measuring device includes means for measuring a temperature of the human body.

6. The clinical thermometer according to claim 1, wherein the illumination device includes means for illuminating an armpit of the human body.

7. The clinical thermometer according to claim 1, wherein the portion of the human body is the armpit.

8. The clinical thermometer according to claim 1, wherein said main body is formed in a substantially flat shape, said display is provided on a first face of the main body, said probe part extends from a second face of the main body, and said shoulder part is formed on said second face and includes means for restricting the extent of insertion when said probe is inserted under an armpit of a human body.

9. The clinical thermometer according to claim 8, further comprising:
   a switch configured to start the operation of temperature measurement, the switch also being configured to turn off said illumination device after the illumination is lit for a predetermined time period.

10. The clinical thermometer according to claim 8, further comprising:
    a backlight illumination device configured to facilitate viewing of said display, wherein said backlight illumination device is configured to distribute light from a light source shared by said backlight illumination device and said illumination device.

11. The clinical thermometer according to claim 1, further comprising:
a switch configured to start the operation of temperature measurement, the switch also being configured to turn off said illumination device after the illumination is lit for a predetermined time period.

12. The clinical thermometer according to claim 11, wherein the switch is configured to simultaneously provide electricity to the illumination device and the measuring device.

13. The clinical thermometer according to claim 11, further comprising:
a backlight illumination device configured to facilitate viewing of said display, wherein said backlight illumination device is configured to distribute light from a light source shared by said backlight illumination device and said illumination device.

14. The clinical thermometer according to claim 1, wherein said illumination device is located at one of said shoulder part and said probe part.

15. The clinical thermometer according to claim 14, wherein said main body is formed in a substantially flat shape, said display is provided on a first face of the main body, said probe part extends from a second face of the main body, and said shoulder part is formed on said second face and includes means for restricting the extent of insertion when said probe is inserted under an armpit of the human body.

16. The clinical thermometer according to claim 14, further comprising:
a switch configured to start the operation of temperature measurement, the switch also being configured to turn off said illumination device after the illumination is lit for a predetermined time period.

17. The clinical thermometer according to claim 14, further comprising:
a backlight illumination device configured to facilitate viewing of said display, wherein said backlight illumination device is configured to distribute light from a light source shared by said backlight illumination device and said illumination device.

* * * * *